United States Patent
Tanuma et al.

(10) Patent No.: US 9,244,456 B2
(45) Date of Patent: Jan. 26, 2016

(54) TOOL PATH GENERATION METHOD AND APPARATUS

(75) Inventors: Masashi Tanuma, Kanagawa (JP); Takashi Komori, Kanagawa (JP); Takahiro Yoshimura, Kanagawa (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 351 days.

(21) Appl. No.: 13/880,173

(22) PCT Filed: Oct. 25, 2010

(86) PCT No.: PCT/JP2010/069243
§ 371 (c)(1),
(2), (4) Date: Apr. 18, 2013

(87) PCT Pub. No.: WO2012/056554
PCT Pub. Date: May 3, 2012

(65) Prior Publication Data
US 2013/0204426 A1 Aug. 8, 2013

(51) Int. Cl.
*G05B 19/18* (2006.01)
*G05B 19/41* (2006.01)

(52) U.S. Cl.
CPC .............. *G05B 19/182* (2013.01); *G05B 19/41* (2013.01); *G05B 2219/35018* (2013.01)

(58) Field of Classification Search
CPC ................. G05B 19/182; G05B 19/41; G05B 2219/35018
See application file for complete search history.

(56) References Cited

U.S. PATENT DOCUMENTS

| 3,328,655 | A | * | 6/1967 | Tripp | 318/571 |
| 4,823,275 | A | * | 4/1989 | Tanaka et al. | 700/187 |
| 5,526,272 | A | * | 6/1996 | Kondo et al. | 700/178 |
| 5,703,782 | A | * | 12/1997 | Dundorf | 700/182 |
| 5,926,389 | A | * | 7/1999 | Trounson | 700/187 |
| 6,311,098 | B1 | * | 10/2001 | Higasayama et al. | 700/159 |
| 7,450,127 | B2 | * | 11/2008 | Hong et al. | 345/474 |
| 2003/0204285 | A1 | * | 10/2003 | Thomas et al. | 700/182 |
| 2012/0215334 | A1 | * | 8/2012 | Tanuma et al. | 700/97 |

FOREIGN PATENT DOCUMENTS

| JP | 03-075905 A | 3/1991 |
| JP | 09-075905 | 3/1991 |
| JP | 07-204987 | 8/1995 |
| JP | 10-240329 A | 9/1998 |
| JP | 2009-199483 A | 9/2009 |
| KR | 10-2000-0005003 A | 1/2000 |

* cited by examiner

*Primary Examiner* — Ramesh Patel
(74) *Attorney, Agent, or Firm* — Paul & Paul

(57) ABSTRACT

A method including a bend angle calculation step of calculating a bend angle θ at each connecting point of a broken line which is obtained by successively connecting a predetermined plurality of machining points P1 to P3 by line segments, an approximation curve derivation step of deriving an approximation curve L5 closer to the connecting point the larger the bend angle θ calculated by the bend angle calculation step, and a tool path generation step of generating a tool path PA7 along the approximation curve L5 derived by the approximation curve derivation step.

2 Claims, 9 Drawing Sheets

TOOL PATH GENERATION METHOD AND APPARATUS

TECHNICAL FIELD

The present invention relates to a tool path generation method and apparatus for generating a tool path at the time of machining a workpiece.

BACKGROUND ART

As this type of a tool path generation method, in general, smoothing treatment which approximates a broken line obtained by connecting a plurality of machining points by a curve so as to generate a smooth tool path is known. If such smoothing treatment is carried out across-the-board at all of the machining path including parts with shapes of large bend angles, the error in shape from the desired machined shape increases and thus, the machined shape may be conversely degraded. Considering this point, for example, Patent Literature 1 describes a method of comparing a bend angle of a broken line with a predetermined threshold value and validating (turning on) or invalidating (turning off) the smoothing treatment in accordance with their relative magnitudes.

In this regard, machining point data is generally prepared by utilizing a CAD/CAM system etc. For this reason, even if a curvature of a machined surface is constant, the lengths of the broken line segments (block lengths) vary and the bend angles also vary. Therefore, if the method, like the one described in the above Patent Literature 1, of turning the smoothing treatment on and off at a specific bend angle is used, there will be portions where the smoothing treatment is turned on and portions where it is turned off regardless of the curvature of the machined surface being constant and therefore, it is difficult to obtain a smooth machined surface.

CITATIONS LIST

Patent Literature 1
Japanese Unexamined Patent Publication No. 2009-199483

SUMMARY OF INVENTION

The present invention is a tool path generation method for generating a tool path at a time of machining a workpiece, including a bend angle calculation step of calculating a bend angle at each connecting point of a broken line which is obtained by successively connecting a predetermined plurality of machining points by line segments, an approximation curve derivation step of deriving an approximation curve closer to the connecting point the larger the bend angle calculated by the bend angle calculation step, and a tool path generation step of generating the tool path by a new broken line along the approximation curve derived by the curve derivation step.

Further, the present invention is a tool path generation apparatus for generating a tool path at a time of machining a workpiece, including a bend angle calculation unit calculating a bend angle at each connecting point of a broken line which is obtained by successively connecting a predetermined plurality of machining points by line segments, an approximation curve derivation unit deriving an approximation curve closer to the connecting point the larger the bend angle calculated by the bend angle calculation unit, and a tool path generation unit generating the tool path by a new broken line along the approximation curve derived by the approximation curve derivation unit.

DESCRIPTION OF EMBODIMENTS

Figure 1:
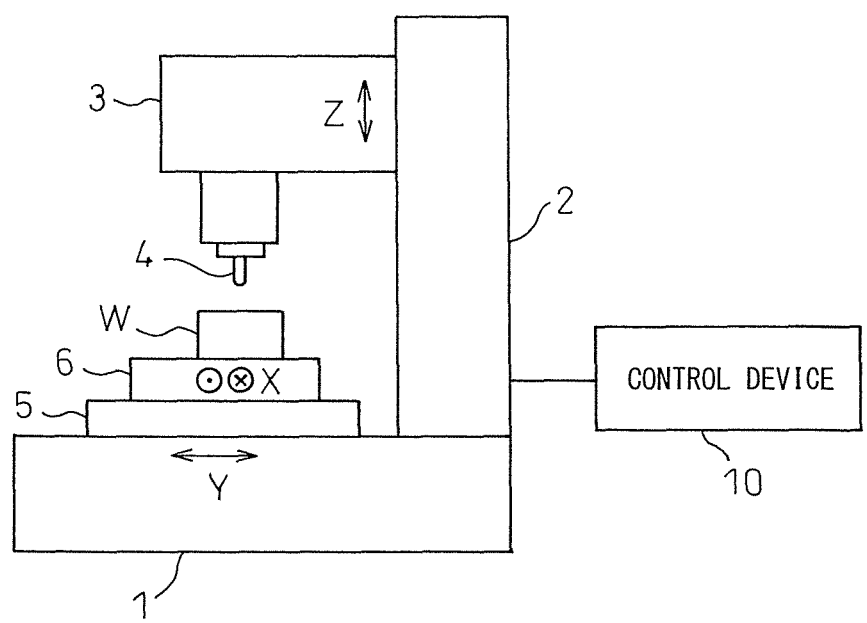
FIG. 1 is a view which shows the general configuration of the entire machine tool which has a tool path generation apparatus according to an embodiment of the present invention.

Hereinafter, referring to FIG. 1 to FIG. 11, embodiments of a tool path generation apparatus according to present invention will be explained. FIG. 1 is a view which shows a general configuration of the entire machine tool which has the tool path generation apparatus according to an embodiment of the present invention and shows a vertical machining center as an example.

A column 2 is erected on a bed 1. At the column 2, a spindle head 3 is supported movably in the up-down direction (Z-axis direction) via a linear feed mechanism. At the spindle head 3, a tool 4 is attached facing downward via the spindle. The tool 4 is, for example, an end mill and is driven to rotate by a spindle motor inside of the spindle head 3. On the bed 1, a saddle 5 is supported movably in the horizontal direction (Y-axis direction) via a linear feed mechanism. On the saddle 5, a table 6 is supported movably in the horizontal direction (X-axis direction) perpendicular to the Y-axis direction. Each of the linear feed mechanisms is, for example, comprised of a ball screw and a servo motor which drives rotation of the ball screw. Due to the above configuration, the tool 4 and the workpiece W move relative to each other in the three perpendicular axis directions (X-, Y-, and Z-directions) whereby the workpiece W is worked.

The spindle motor and the servo motors are controlled in accordance with a machining program by a control device 10. In the machining program, a path of movement of the tool 4 is set as a tool path in advance. The tool 4 moves relative to the workpiece 4 along this tool path.

The machining program is prepared by utilizing a known CAD/CAM system. That is, the CAD data corresponding to the machined shape of the workpiece W is used as the basis to prepare CAM data consisting of a set of fine linear commands. This CAM data is comprised of a tremendous volume of point group data, so data is thinned from the CAD data in accordance with predetermined rules to give an amount of data suitable for a machining program. Due to this, a machining program is prepared.

Figure 2A:
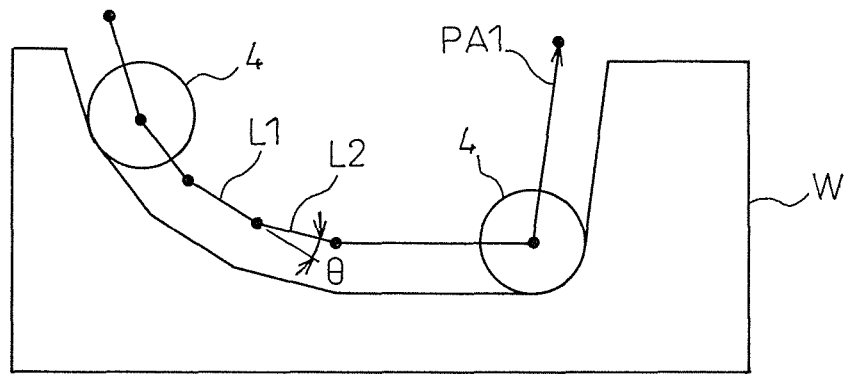
FIG. 2A to FIG. 2C are views which show transitions in the generation of a tool path.

FIG. 2A is a view which shows an example of a tool path according to the thus prepared machining program. A comparatively rough broken line is used to show the tool path PA1. The machining program is given coordinate data of end points of the broken line segments (called "machining command points", "block end points", or simply "machining points") in a block format. The block end points are successively connected to give the tool path PA1 of FIG. 2A. Below, in a broken line comprised of consecutive line segments (FIG. 2A, L1 and L2), the angle θ formed by the line segment L2 with the extension of the line segment L1 when it is extended toward L2 is defined as a "bend angle".

If the tool 4 is moved along the tool path PA1 comprised of the comparatively rough broken line which is shown in FIG. 2A, it is not possible to obtain a smooth machined surface of the workpiece W. Therefore, a predetermined curve approximation formula is used to calculate an approximation curve for each machining point, and the approximation curve is used as the basis to correct the tool path, which is referred as so-called "smoothing treatment".

Figure 2B:
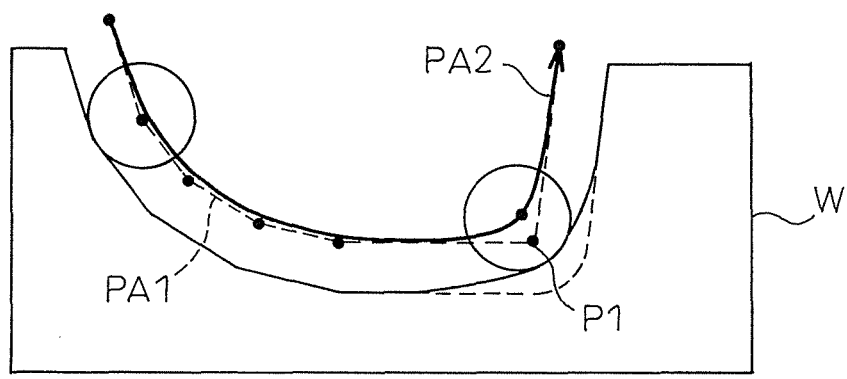
Figure 2C:
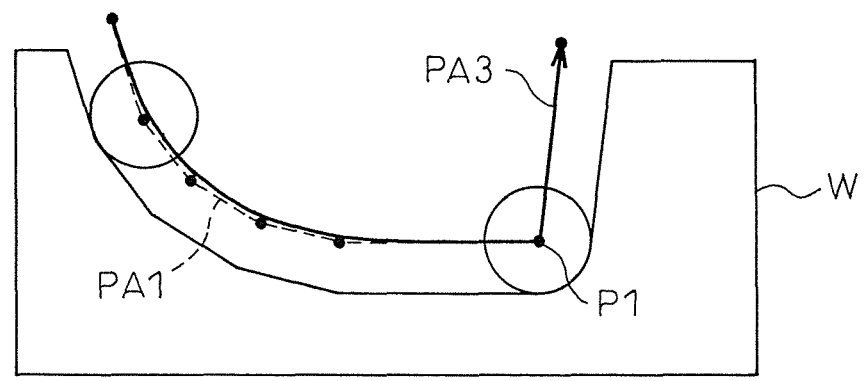

FIG. 2B is a view which shows an example of a tool path after the smoothing treatment. After the smoothing treatment, the tool path PA2 is given by a large number of points of coordinate data along the approximation curve, and the smoothing treatment results in a smooth curve. For this reason, a smooth machined surface is obtained. On the other hand, at a machining point P1 with a large bend angle, the tool path PA2 greatly deviates from the targeted workpiece shape (dotted line) and therefore the desired shape of the workpiece cannot be obtained. To avoid this problem, it may be considered to not carry out the smoothing treatment across-the-board for all of the machining points, but to invalidate the smoothing treatment when a bend angle θ is large, FIG. 2C is a view which shows an example of a tool path PA3 which is obtained by invalidating the smoothing treatment when a bend angle θ at a machining point is larger than a threshold value θa. If validating (turning on) and invalidating (turning off) the smoothing treatment in accordance with bend angles θ in this way, it is possible to suppress shape error of the workpiece W at a machining point P1 with a large bend angle θ.

Figure 3A:
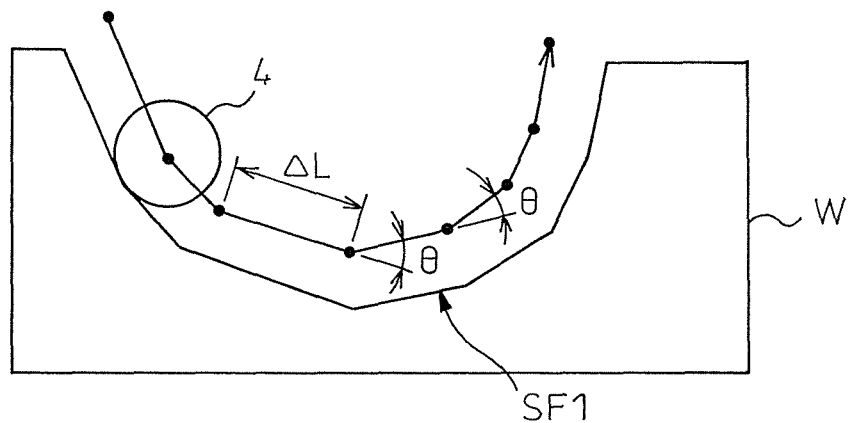
FIG. 3A and FIG. 3B are views which explain problem points in the case of smoothing treatment such as in FIG. 2C.
Figure 3B:
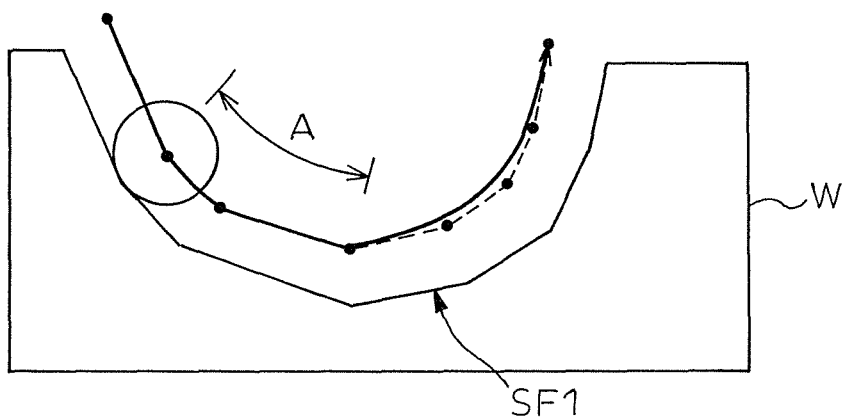

However, machining point data is prepared by utilizing a CAD/CAM system. Therefore, even if the curvature of a machined surface SF1 is constant such as when machining a cylindrical shape, the lengths of the broken line segments (block lengths ΔL) will differ and the bend angles θ will also differ as shown in FIG. 3A. For this reason, when carrying out smoothing treatment, there will be a region A where the smoothing treatment is partially turned off as shown in FIG. 3B, so it will be difficult to obtain a smooth machined surface.

Figure 4:
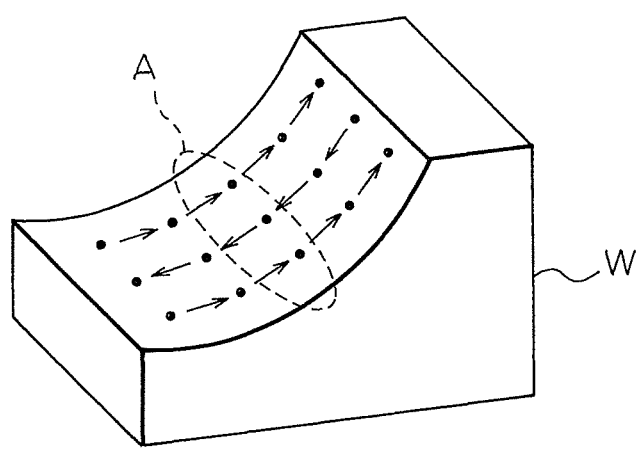
FIG. 4 is a view which explains other problem points in the case of smoothing treatment such as in FIG. 2C.

Furthermore, differences in machining points, as shown in FIG. 4, also occur among adjoining tool paths (dotted line region A). Differences also occur in the bend angles θ. For this reason, when a threshold value θa is set near the bend angles θ of the machining points in this region A, there will be a tool path where the smoothing treatment is turned on and a tool path where it is turned off and therefore, it will not be possible to obtain a smooth machined surface in whole. In order to solve the above such problem, in the present embodiment, the tool path is generated in the following way.

Figure 5:
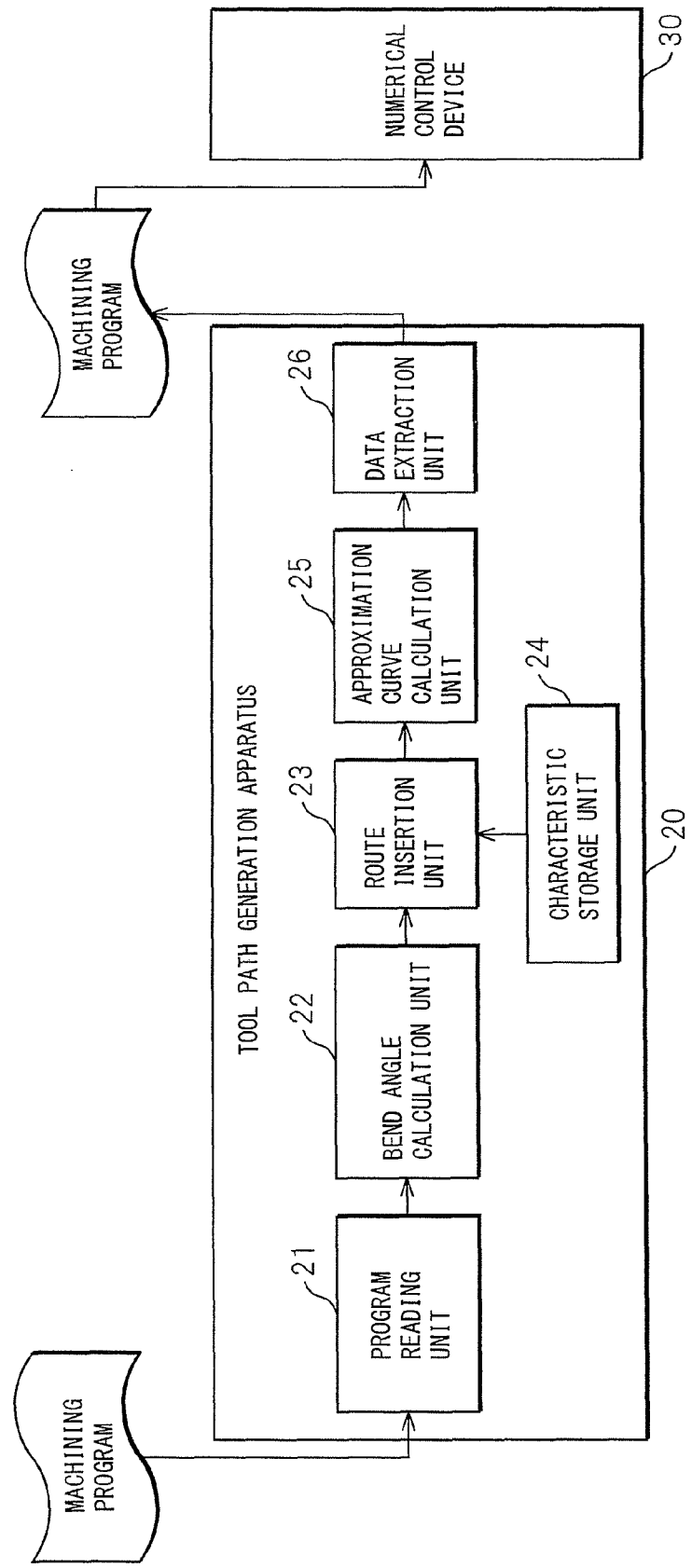
FIG. 5 is a block diagram which shows the configuration of a control device of FIG. 1.

FIG. 5 is a block diagram which shows the configuration of the control device 10. The control device 10 has a tool path generation device 20 which generates a tool path at the time of machining a workpiece and a numerical control device 30 which uses the NC data set by the machining program as the basis to control the motors of the machine tool so that the tool 4 moves relative to the workpiece W along this tool path.

The tool path generation device 20 is comprised of a processing system which has a CPU, ROM, RAM, and other peripheral circuits etc. It has a program reading unit 21, a bend angle calculation unit 22, a route insertion unit 23, a characteristic storage unit 24, an approximation curve calculation unit 25, and a data extraction unit 26.

The program reading unit 21 successively reads the block end point data of the machining program which is prepared by the CAD/CAM system, i.e., the 3D coordinate data of the machining points (machining point data).

Figure 6:
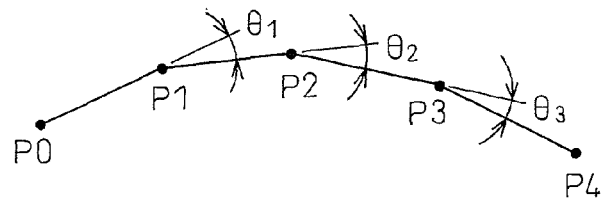
FIG. 6 is a view which explains processing in the bend angle calculation unit of FIG. 5.

The bend angle calculation unit 22 successively calculates the bend angle θ of each machining point, based on the machining point data read by the program reading unit 21. For example as shown in FIG. 6, if the machining point data of the three points P0, P1, and P2 are read, the bend angle θ1 at P1 is calculated, if the machining point data of P3 is read, the bend angle θ2 at P2 is calculated, and if the machining point data of P4 is read, the bend angle θ3 at P3 is calculated. It is also possible to read all of the machining point data, then calculate the bend angles θ at the machining points all together.

The route insertion unit 23 inserts a route (imaginary block R) along the imaginary axis α which perpendicularly intersects each of the X-axis, Y-axis, and Z-axis at the machining points used for calculation of the bend angles θ. After that, the route insertion unit 23, the approximation curve calculation unit 25, and the data extraction unit 26 carry out the smoothing treatment by using the concept of the imaginary block R to generate a new tool path. Here, in order to facilitate the explanation of the imaginary block R, first, the explanation will be given assuming that the machining points are given by 2D coordinate data.

Figure 7:
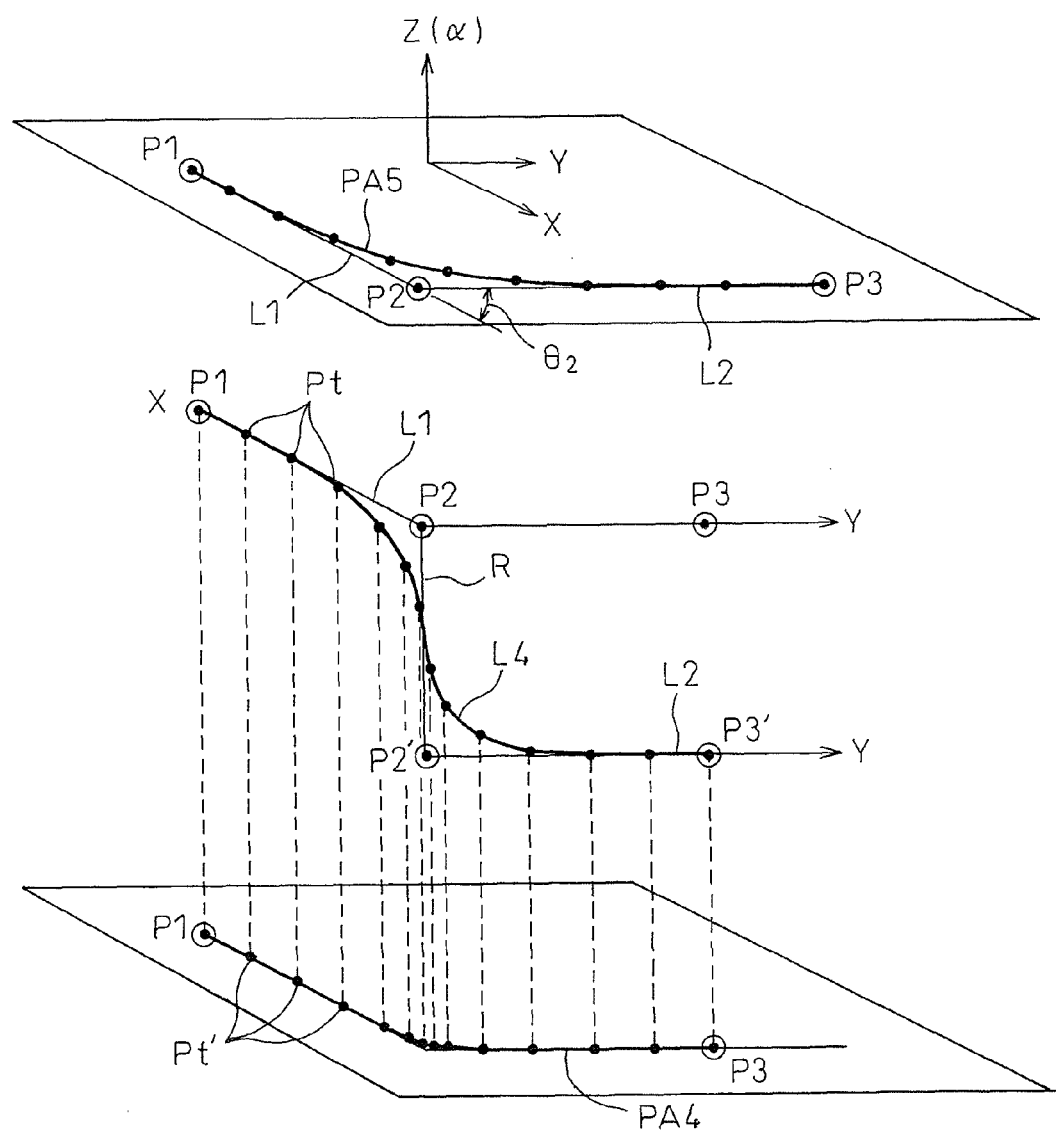
FIG. 7 is a view which explains processing in a route insertion unit, approximation curve calculation unit, and data extraction unit of FIG. 5, in the case where machining points are comprised of 2D data.

FIG. 7 is a conceptual view of an imaginary block R in the case where the machining points are given by 2D coordinate data. In the figure, the machining points P1, P2, and P3 are respectively set on an XY plane (upper figure), while the X- and Y-components of the points are respectively P1 (x1, y1), P2 (x2, y2), and P3 (x3, y3). P1 and P2 are connected by the line segment L1, and P2 and P3 are connected by the line segment L2, whereby a broken line is formed. The curve PA5 in the figure is a tool path which is obtained by approximation of the machining points P1, P2, and P3 by a curve on the XY plane.

When such machining points P1, P2, and P3 are given by only the XY components, the axis perpendicular to each of the X-axis and Y-axis is the Z-axis. The imaginary axis α is equal to the Z-axis. Therefore, if inserting the imaginary block R at the machining point P2 which has the bend angle θ2, i.e., between the line segments L1 and L2, toward the Z-axis direction, the line segment L2 is shifted in the Z-axis direction, and a new broken line which successively connects the end points P1 and P2 of the line segment L1 and the end points P2' and P3' of the line segment L2 after shifting is obtained. At this time, the length of the inserted imaginary block R (imaginary block length ΔR) is determined by a characteristic feature of the imaginary block length ΔR which is stored in the characteristic storage unit 24.

Figure 8:
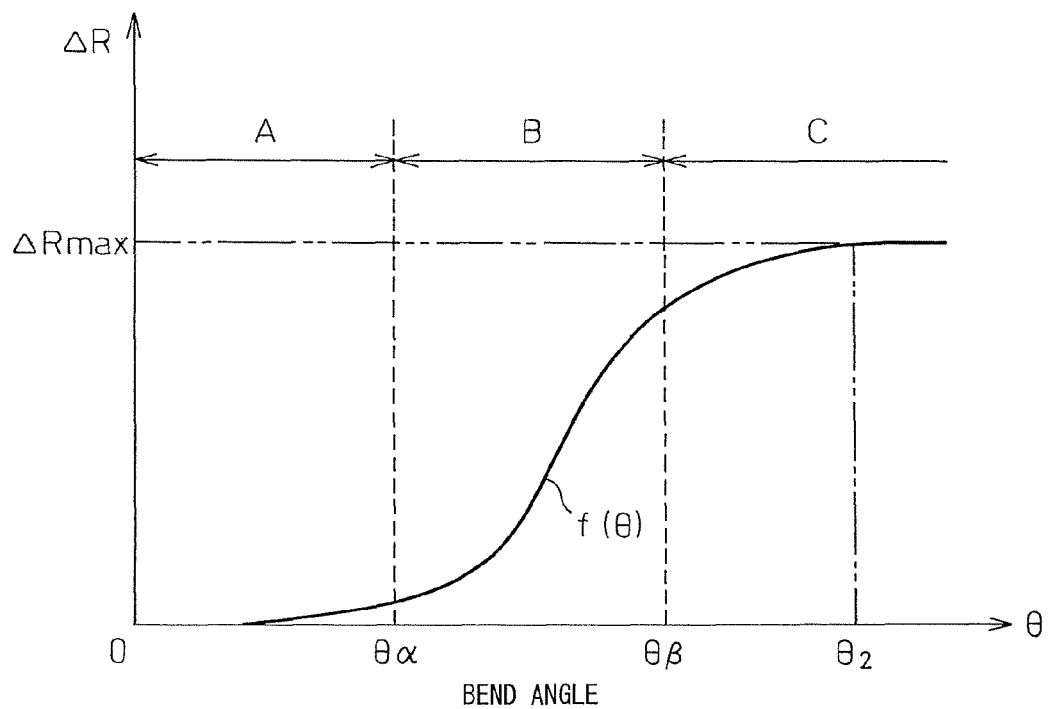
FIG. 8 is a view which shows a characteristic feature of the imaginary block length which is stored in a characteristic storage unit of FIG. 5.

FIG. 8 is a view which shows the feature f(θ) of the imaginary block length ΔR which is stored in the characteristic storage unit 24. In the figure, the imaginary block length ΔR increases in a S-shape along with an increase of the bend angle θ. That is, in a region A with a small bend angle θ (0≤θ≤θα), ΔR is substantially 0, while in a region B with a bend angle θ larger than a predetermined value θα (θα<θ≤θβ), ΔR increases by a comparatively large ratio along with an increase of the bend angle θ, and in a region C with a bend angle θ over a predetermined value θβ (θβ<θ), ΔR is substantially constant (=ΔRmax). The imaginary block length ΔR which corresponds to the bend angle θ2 at the machining point P2 of FIG. 7 is the maximum ΔRmax.

If expressing the α coordinate component at the machining point P2 by α2 (=−ΔRmax), the X, Y, and α components of the points P1, P2, P2', and P3' which constitute the new broken line become respectively P1 (x1, y1, 0), P2 (x2, y2, 0), P2' (x2, y2, α2), and P3' (x3, y3, α2). The approximation curve calculation unit 25 of FIG. 5 calculates the approximation curve L4 of these four points (FIG. 7).

Figure 9:
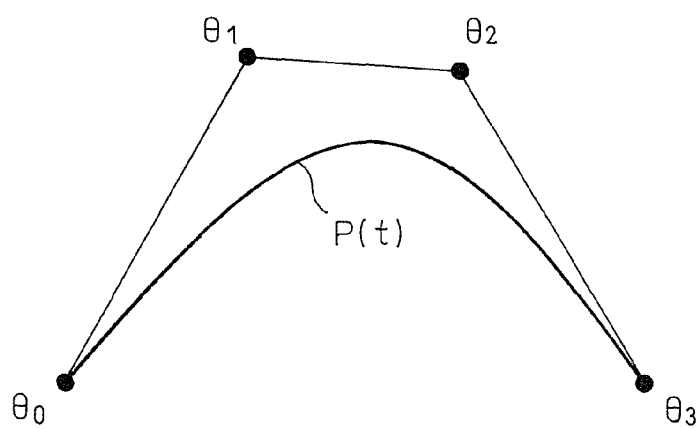
FIG. 9 is a view which explains a calculation formula of an approximation curve.

The approximation curve L4 is, for example, calculated by a 3D Bezier curve. A "Bezier curve" is an approximation curve P(t) of the four points Q0, Q1, Q2, and Q3 such as shown in FIG. 9. The calculation formula is expressed by the following formula (I).

$$P(t)=(1-t)^3 Q0+3t(1-t)^2 Q1+3t^2(1-t)Q2+t^3 Q3 \quad (I)$$

The letter "t" corresponds to the path on the curve P(t) which starts from Q0. By entering the X-, Y-, Z-, and other coordinate components into Q0 to Q3 of the formula (I) and changing "t" over the entire length of 0 to P(t), the coordinate values of P(t) are found for each coordinate component.

Specifically, when finding the approximation curve L4 of FIG. 7, by entering the X-components x1, x2, x2, and x3 of P1, P2, P2', and P3' into Q0 to Q4 and changing "t" by a predetermined pitch, the X-component of each point Pt is found for each predetermined pitch. Similarly, by entering the Y-components y1, y2, y2, and y3 of P1, P2, P2', and P3' into Q0 to Q4 and changing "t" by a predetermined pitch, the Y-component of each point Pt is found for each predetermined pitch. Further, by entering the α-components 0, 0, α2, and α2 of P1, P2, P2', and P3' into Q0 to Q4 and changing "t" by a predetermined pitch, the α-component of each point Pt is found for each predetermined pitch. By connecting the points Pt which are found in the above way, the approximation curve L4 of FIG. 7 is obtained in the XYα space.

The data extraction unit 26 extracts the remaining components after removing the α-components from the approximation curve L4, i.e., the XY components of the points Pt. Due to this, as shown in FIG. 7, it is possible to obtain a plurality of points Pt' which are points projecting the points Pt on the XY plane. By successively connecting these Pt', a new tool path PA4 can be generated.

The thus generated tool path PA4 has a smaller inside curve amount of the tool path (distance from machining point P2 to tool path PA4) compared with the tool path PA5 which is obtained by simply approximating the machining points P1 to P3 by a curve (FIG. 7) and is suppressed in strength of smoothing of the inside curve amount of the tool path. Here, the "strength of smoothing" is determined in accordance with the imaginary block length ΔR which is inserted at the machining point P2. The larger the bend angle θ is, the longer the imaginary block length ΔR becomes (FIG. 8). For this reason, the larger the bend angle θ, the more the strength of the smoothing can be suppressed.

In the example of FIG. 7, the bend angle θ is large and the block length ΔR is long, so the approximation curve L4 passes on the imaginary block R and the inside curve amount becomes 0. However, when the bend angle θ is small, the approximation curve L4 does not pass on the imaginary block R and the inside curve amount does not become 0. That is, in a region C where the bend angle θ is larger than θβ of FIG. 8, the inside curve amount becomes 0 and a result similar to those when the smoothing treatment is turned off, shown in the machining point P1 of FIG. 2C, is obtained. On the other hand, in the region A where the bend angle θ is smaller than θα of FIG. 8, the inside curve amount is large and a result similar to those when the smoothing treatment is turned on, shown in the machining point P1 of FIG. 2B, is obtained.

Figure 10:
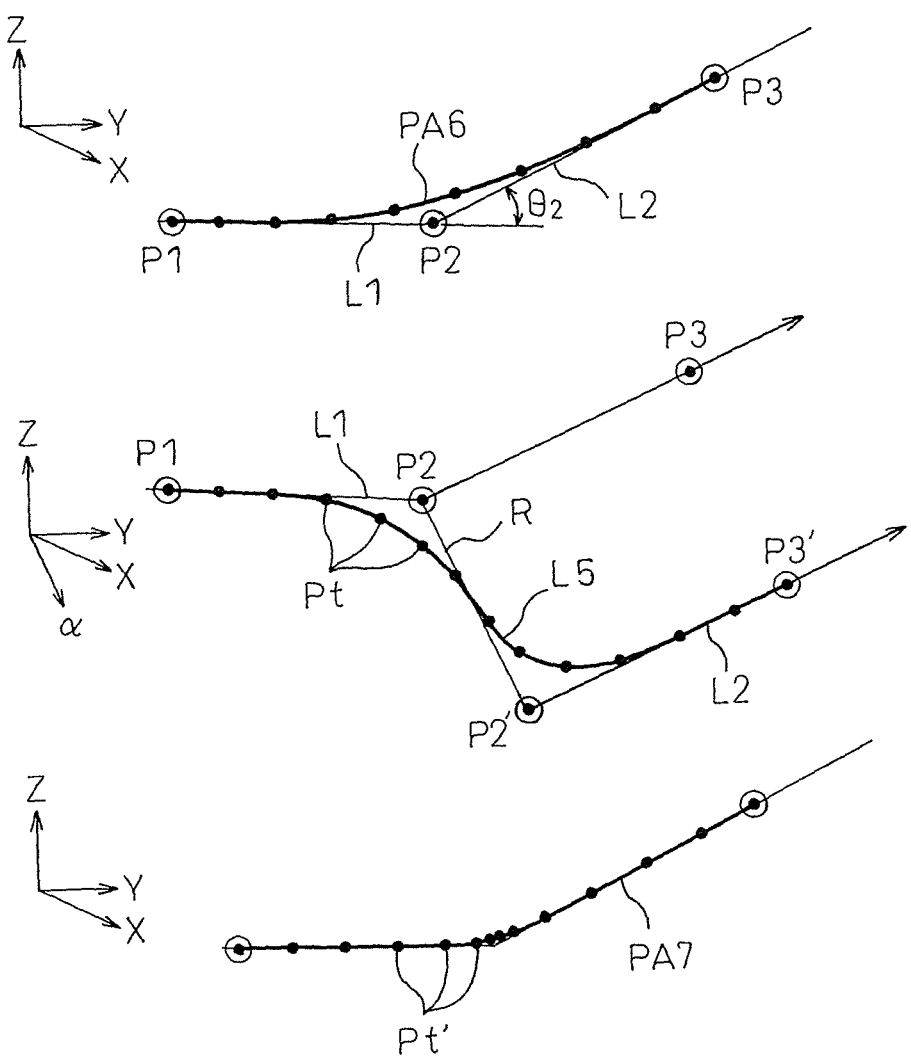
FIG. 10 is a view which explains processing in a route insertion unit, approximation curve calculation unit, and data extraction unit of FIG. 5, in the case where machining points are comprised of 3D data.

Next, as shown in FIG. 10, the smoothing treatment when the machining points P1 to P3 are given by the XYZ coordinates will be explained. In this case, after the bend angle calculation unit 22 calculates the bend angle θ2 at the machining point P2, the route insertion unit 23 inserts an imaginary block R along the imaginary axis α which is perpendicular to each of the XYZ axes, between the line segment L1 and the line segment L2. Although the imaginary axis α is a conceptual axis which cannot actually be shown, it is shown for convenience sake in FIG. 10. FIG. 10 shows the tool path PA6 obtained by just smoothing treatment of the machining points P1 to P3.

The imaginary block length ΔR is determined by the characteristic feature f(θ) of FIG. 8. The approximation curve calculation unit 25 calculates the approximation curve L5 of the points P1, P2, P2', and P3' after insertion of the imaginary block R by the above formula (I). That is, by entering the XYZα coordinate components of P1, P2, P2', and P3' into Q0 to Q3 of formula (I) and changing "t" over the entire length of 0 to P(t), the coordinate values of P(t) are determined for each coordinate component.

The data extraction unit 26 extracts the components remaining after removal of the α-components from the approximation curve L5, i.e., the XYZ components of the points Pt. Due to this, as shown in FIG. 10, it is possible to obtain points Pt' corresponding to Pt in the XYZ 3D space. By successively connecting these Pt', a new tool path PA7 can be generated.

The thus generated tool path PA7 has a smaller inward curve amount of the tool path compared with the tool path obtained by just smoothing treatment of the machining points P1 to P3 and is suppressed in strength of smoothing.

The point group data obtained by the data extraction unit 26 is output to a not shown program rewriting unit, and the block data of the machining program is rewritten along the tool path PA7. Based on this machining program, the numerical control device 30 controls the drive of the motors. Due to this, the workpiece W is machined along the tool path PA7.

The operation of the tool path generation method of according to the present embodiment is summarized as follows:

First, the program reading unit 21 reads the machining program which is generated by the CAD/CAM system, while the bend angle calculation unit 22 calculates the bend angle θ of the broken line which is obtained by successively connecting the block end points of the machining program (bend angle calculation step).

Next, an approximation curve L5 closer to the connecting point P2 the larger the calculated bend angle θ (for example, θ2) is derived (curve derivation step), and a tool path PA7 is generated along the approximation curve L5 (tool path generation step).

In this case, the route insertion unit 23 inserts an imaginary block R, which is parallel to the imaginary axis α perpendicular to the X-axis, Y-axis, and Z-axis and which has an imaginary block length ΔR which corresponds to the bend angle θ2, at the connecting point P2. Due to this, the machining points P2 and P3 respectively move in parallel along the imaginary axis α by the imaginary block length ΔR whereby the imaginary points P2' and P3' are set. Next, the approximation curve calculation unit 25 calculates the approximation curve L5 of the four points P1, P2, P2', and P3', and the data extraction unit 26 extracts the XYZ components of the approximation curve L5 and thus, the new tool path PA7 is generated by the point group data of the 3D space.

By generating the tool path PA7 in this way, it is possible to change the strength of the smoothing in accordance with the bend angle θ2 and possible to optimize the inward curve amount of the tool path according to the smoothing treatment. That is, imaginary block length ΔR corresponds to the strength of the smoothing. When the bend angle θ is large, the inward curve amount is small (smoothing becomes weak), while when the bend angle θ is small, the inward curve amount is large (smoothing becomes large). For this reason, even when the positions of the machining points differ on the same tool path or between adjoining tool paths and the bend angles θ differ, it is possible to smoothly machine the workpiece W and obtain the precise workpiece shape.

Figure 11:
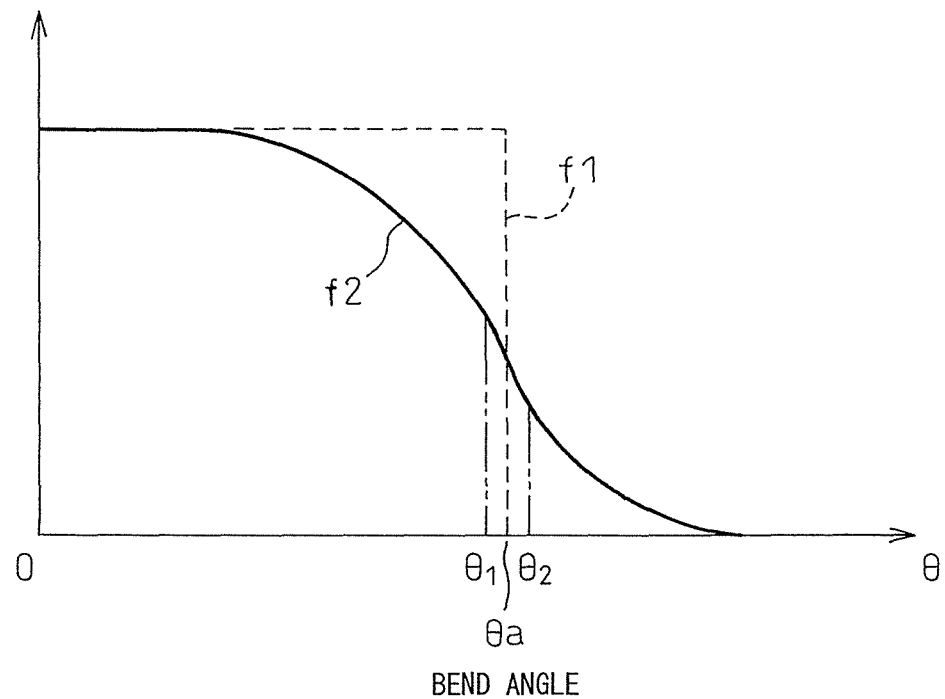
FIG. 11 is a view which explains the advantageous effects according to the present invention.

FIG. 11 is a view which shows a characteristic feature f1 (broken line) of the smoothing strength in the case of turning the smoothing treatment on and off in accordance with the relative magnitude of a bend angle θ and threshold value θa, and a characteristic feature f2 (solid line) of the smoothing strength in the case of carrying out the smoothing treatment according to the present embodiment. As explained above, the smoothing strength corresponds to the inward curve amount of the connecting point.

According to the characteristic feature f1, for example, when the bend angles of adjoining machining points P1 and P2 are θ1 and θ2, at the machining point P1, the smoothing treatment is turned on (smoothing strength maximum), while at the machining point P2, the smoothing treatment is turned off (smoothing strength 0). For this reason, despite the bend angle θ not changing that much, the smoothing strength rapidly changes and obtaining a smooth machined surface becomes difficult. As opposed to this, according to the characteristic feature f2, if the bend angles are θ1 and θ2, the change in smoothing strength is small and a smooth machined surface can be obtained.

According to the present embodiment, the following functions and effects can be exhibited:

(1) The bend angles θ at the connecting points of the broken line obtained by successively connecting a plurality of machining points are calculated, an approximation curve L5 (FIG. 10) closer to the connecting points the larger the bend angles θ is derived, and a tool path PA7 is generated along the approximation curve L5. Due to this, it is possible to suppress error of the machined shape of the workpiece W and obtain a smooth machined surface even if the bend angles θ differ.

(2) An imaginary block R which is perpendicular to the XYZ axes and has a length corresponding to the bend angle θ is inserted, and an approximation curve L5 of the broken line after insertion of the imaginary block is calculated. Therefore, an approximation curve L5 closer to the connecting points the larger the bend angles θ can be easily derived.

(3) The point group data which is obtained by extraction of the XYZ components from the approximation curve L5 is used as the basis to generate the tool path PA7, so it is possible to easily generate the tool path PA7 of a 3D space from the approximation curve L5 which uses the imaginary block R. In this case, the imaginary axis α perpendicularly intersects each of the XYZ axes, so even if removing the components of the imaginary axis α, there is no effect on the other XYZ coordinate components.

(4) The characteristic feature f(θ) of the imaginary block length ΔR is divided into substantially three regions A to C (FIG. 8). At the region A with a small bend angle θ and the region C with a large one, the imaginary block length ΔR is made substantially constant, while at the intermediately region B where the bend angle θ is θα to θβ, the imaginary block length ΔR is made to gradually become longer along with an increase of the bend angle θ. Due to this, it is possible to change the rate of change of the smoothing strength in accordance with the magnitude of the bend angle θ and possible to obtain excellent smoothing corresponding to the differences in positions of the machining points compared with the case of changing the smoothing strength by a constant rate of change corresponding to the bend angle θ.

The feature of the present invention is changing the strength of smoothing in accordance with the bend angle θ. As long as carrying out a smoothing treatment closer to the connecting point the larger the bend angle θ and using a new broken line after the smoothing treatment to generate the tool path PA5, the approximation curve derivation step and the tool path generation step as a smoothing treatment step may be configured in any way. That is, it is also possible to generate a tool path closer to the connecting point the larger the bend angle θ without inserting the imaginary block R.

In the above embodiment, in a broken line obtained by successively connecting three successive machining points (first machining point P1, second machining point P2, and third machining point P3) by line segments, the larger the bend angle θ at the middle machining point P2, the greater the amount of movement along the imaginary axis α perpendicular to the XYZ axes is made by moving in parallel the machining points P2 and P3 along the imaginary axis α in the same direction to set imaginary points (first imaginary point P2' and second imaginary point P3'), and an approximation curve L5 of these points P1, P2, P2', and P3' is calculated. However, as long as deriving an approximation curve closer to the connecting point the larger the bend angle θ, the approximation curve derivation step may be configured in any way.

In the above embodiment, the program reading unit 21 reads the machining program prepared by the CAD/CAM system and the bend angle calculation unit 22 calculates the bend angles θ at the individual connecting points. However, it is possible to prepare the initial machining program without going through a CAD/CAM system. The configuration of the bend angle calculation unit is not limited to this. The route insertion unit 23 inserts the imaginary axis α at a connecting point and the approximation curve calculation unit 25 approximates the curve by a Bezier curve to find the approximation curve L5. However, it is also possible to approximate a curve by a B spline curve or NURBS curve or other curve so as to find the approximation curve L5. The configuration of the approximation curve derivation unit is not limited to the one which is explained above. The data extraction unit 26 extracts the XYZ components of the approximation curve L5 to generate the tool path PA7. However, it is also possible to thin a predetermined number of data after extraction of the XYZ components, in order to generate the tool path. The configuration of the tool path generation unit is not limited to the one explained above.

In the above embodiment, the control device 10 provided at the machine tool is provided with the tool path generation apparatus 20 and the numerical control device 30. However, the numerical control device 20 may also be provided with the tool path generation apparatus 30. Further, it is also possible to provide the tool path generation apparatus 20 separate from the control device 10. In the above embodiment, although the tool path generation apparatus 10 is applied to a machining center, the tool path generation apparatus of the present invention can be similarly applied to another machine tool which requires generation of a tool path at the time of machining a workpiece.

According to the present invention, smoothing treatment closer to the connecting point the larger the bend angle at the connecting point is carried out and a tool path is generated by the new broken line after the smoothing treatment. Therefore, it is possible to suppress error of the machined shape of the workpiece and obtain a smooth machined surface even if there are differences in the bend angles.

REFERENCE SIGNS LIST 10 control device
20 tool path generation apparatus
21 program reading unit
22 bend angle calculation unit
23 route insertion unit
24 characteristic storage unit
25 approximation curve calculation unit
26 data extraction unit
30 numerical control device
L4, L5 approximation curve
PA1 to PA7 tool path

The invention claimed is:

1. A tool path generation method for generating a tool path at a time of machining a workpiece, comprising:
a bend angle calculation step of calculating a bend angle at each connecting point of a broken line which is obtained by successively connecting a predetermined plurality of machining points by line segments, wherein each bend angle is obtained by selecting three successive machining points from said plurality of machining points as a first machining point, a second machining point, and a third machining point, respectively, and successively connecting them by line segments in order to obtain a bend angle at said second machining point;
an approximation curve derivation step of setting a first imaginary point and a second imaginary point by moving, in parallel and in the same direction, the second machining point and the third machining point, along an imaginary axis perpendicular to the X-, Y-, and Z-axes, by a distance determined by previously stored characteristics, wherein the distance along the axis perpendicular to the X-, Y-, and Z-axes is increased along with the increase in the bend angle at the second machining point calculated in the bend angle calculation step when the first machining point, the second machining point, and the third machining point are successively connected by the line segments to form a broken line, and calculating an approximation curve approximating a broken line extending through the first machining point, the second machining point, the first imaginary point and the second imaginary point; and
a tool path generation step of generating the tool path along a point group data obtained by extracting X-, Y-, and Z-components of the approximation curve derived in the approximation curve derivation step, wherein a tool is moved in accordance with the tool path during machining of the workpiece.

2. A tool path generation apparatus for generating a tool path at a time of machining a workpiece, comprising:
a bend angle calculation unit calculating a bend angle at each connecting point of a broken line which is obtained by successively connecting a predetermined plurality of machining points by line segments, wherein each bend angle is obtained by selecting three successive machining points from said plurality of machining points as a first machining point, a second machining point, and a third machining point, respectively, and successively connecting them by line segments in order to obtain a bend angle at said second machining point;
an approximation curve derivation unit setting a first imaginary point and a second imaginary point by moving, in parallel and in the same direction, the second machining point and the third machining point, along an imaginary axis perpendicular to the X-, Y-, and Z-axes, by a distance determined by previously stored characteristics, wherein the distance along the axis perpendicular to the X-, Y-, and Z-axes is increased along with the increase in the bend angle at the second machining point calculated in the bend angle calculation step when the first machining point, the second machining point, and the third machining point are successively connected by the line segments to form a broken line, and calculating an approximation curve approximating a broken line extending through the first machining point, the second machining point, the first imaginary point and the second imaginary point; and
a tool path generation unit generating the tool path along a point group data obtained by extracting X-, Y-, and Z-components of the approximation curve derived in the approximation curve derivation unit, wherein a tool is moved in accordance with the tool path during machining of the workpiece.

* * * * *